(12) United States Patent
Williams et al.

(10) Patent No.: US 6,715,050 B2
(45) Date of Patent: Mar. 30, 2004

(54) STORAGE ACCESS KEYS

(75) Inventors: James Williams, Sunnyvale, CA (US); William Bridge, Alameda, CA (US); Richard Long, Belmont, CA (US); Patrick Ritto, Menlo Park, CA (US); Thomas Sepez, Castro Valley, CA (US); Angelo Pruscino, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 296 days.

(21) Appl. No.: 09/873,130

(22) Filed: May 31, 2001

(65) Prior Publication Data

US 2003/0079100 A1 Apr. 24, 2003

(51) Int. Cl.⁷ .............................................. G06F 12/14
(52) U.S. Cl. ........................... 711/164; 707/6; 713/193; 711/152
(58) Field of Search ..................... 707/6, 201; 711/163, 711/164, 152; 713/193, 200

(56) References Cited

U.S. PATENT DOCUMENTS

| | | | | |
|---|---|---|---|---|
| 5,768,632 A | * | 6/1998 | Husted et al. ................. | 710/72 |
| 5,802,590 A | | 9/1998 | Draves ........................ | 711/164 |
| 5,900,019 A | | 5/1999 | Greenstein et al. ......... | 711/164 |
| 6,345,347 B1 | | 2/2002 | Biran .......................... | 711/163 |
| 6,405,202 B1 | | 6/2002 | Britton et al. ................ | 707/9 |

OTHER PUBLICATIONS

Ralph O. Weber, *Information Technology—SCSI Primary Commands—2 (SPC–2)* T10 Project 1236–D Working Draft), Revision 18, May 21, 2000, DNDL Texas, Dallas, TX.

R.C. Burns, R.M. REES*Consistency and Locking for Distributing Updates to Web Servers Workshop*, Jun. 2000, pp. 1–22, Santa Clara, CA, Jun. 2000.

Kenneth W. Preslan, Andrew Barry, Jonathan Brassow, Russell Cattlelan, Adam Manthei, Erling Nygaard, Seth Van Oort, David Tiegland, Mike Tilstra, Matthew O'Keffe, *Implementing Journaling in a Linux Shared Disk File System*, Mar. 2000, To appear in *Proceedings of the Eight NASA Goddard Conference on Mass Storage Systems and Technologies* in cooperation with the Seventeenth IEEE Symposium on Mass Storage Systems.

* cited by examiner

*Primary Examiner*—Gary Portka
(74) *Attorney, Agent, or Firm*—Bingham McCutchen LLP (57) ABSTRACT

Methods are provided for communicating with and regulating access to a storage system contained within a file system. Storage access keys are used to communicate to the file system changes in location of data stored in the storage system. Fence keys are used to regulate access to the storage system.

35 Claims, 9 Drawing Sheets

STORAGE ACCESS KEYS

FIELD OF THE INVENTION

The invention relates to computer systems, and more particularly to methods for communication with and regulating access to a storage system.

BACKGROUND

In certain approaches to implementing a file system, operating system, distributed file system or database (hereinafter collectively referred to for convenience as a "file system"), metadata may be employed to represent the state of the name-space for data objects, including files, logical volumes, and other such objects (hereinafter collectively referred to for convenience as "files"), stored in a storage system associated with the file system. A storage system is a collection of storage devices, with a controller. This metadata can include mapping information that maps the various parts of a data object to the physical locations of those parts, as stored in the storage devices that comprise the storage system. An example of this type of storage system is disclosed in U.S. patent application Ser. No. 09/177,916, filed on Oct. 23, 1998, now U.S. Pat. No. 6,405,284 which is hereby incorporated by reference in its entirety. Many file systems contain multiple distributed nodes, with each node being a discrete sub-system that interacts with the storage system.

Each file is associated with metadata that identifies which storage device and locations on the storage device contain the various parts of the file, and where the parts of the file are located on the device. This metadata is typically stored on the storage system. File system nodes will from time to time access the data pointed to by the metadata. In order to access the data more efficiently, the nodes will cache local copies of the metadata. A problem arises, however, when the storage data is moved from one location within the storage system to another. All cached copies of the metadata must be updated with the new location of the data, to allow proper access to the data. One approach to informing the file system nodes of the changes to the metadata involves messages sent among all the nodes having copies of the metadata. The messages either update the file system nodes with the new location of the data in the storage system, or merely inform the node that data pointed to by the cached metadata is no longer valid. In the latter case, the node is responsible for updating the cached metadata from primary metadata associated with the data.

Unfortunately, using messages for updating/informing the cached copies of the metadata location is relatively expensive and prevents the file system from achieving optimum performance. The volume of messages being transmitted in a file system with a large number of nodes quickly becomes large enough to significantly impact overall performance. Every node containing a cached copy of the metadata pointing to relocated or deleted data, or in some systems every node in the cluster, is updated. Therefore many unnecessary messages are sent out to nodes that wind up discarding the updated metadata before they ever use it. Furthermore, messages can be missed if a new node starts up during the moving process, after the message was sent out but before the primary metadata was updated to reflect the new location.

Another common concern in distributed file systems is called the "split-brain syndrome". Split-brain syndrome is a condition resulting from an error condition that causes communications between one or more nodes in a cluster of nodes sharing storage devices, to be lost. Any operational node in the cluster has no easy way of determining if a node with which it cannot communicate has crashed or is still operating. When this condition occurs, there isn't a secure way for the nodes to serialize file system metadata updates, because global messaging capability is lost. Thus, there is the danger that two processes will attempt to update the metadata associated with a particular allocation unit simultaneously, causing data corruption. Various hardware extensions to storage devices have been proposed that permit inhibiting access to a device by a node. However, these mechanisms restrict all access to the device, from all processes operating on the failing node, not just the processes related to the failed application in the cluster.

SUMMARY OF THE INVENTION

The present invention is directed to methods of communicating with and regulating access to data stored on a storage system.

In an aspect of an embodiment of the invention, metadata update notifications are combined with process-level I/O processing requests.

In another aspect of an embodiment of the invention, data access restrictions are combined with process-level I/O processing requests.

In another aspect of an embodiment of the invention, information about a process making an I/O request is transmitted to the data storage system.

In another aspect of an embodiment of the invention, data access restrictions are isolated to individual processes.

In another aspect of an embodiment of the invention, metadata update notifications are isolated to individual processes.

DETAILED DESCRIPTION OF THE PREFERRED EMBODIMENTS

In an embodiment, a distributed file system contains a storage system that is organized into multiple files. Each file includes one or more chunks of allocated storage that may be distributed amongst a plurality of physical storage devices. Associated with the file system is metadata containing information about the location of the parts of the files, which is stored in "extent maps." An extent map is a listing of allocated storage space, e.g. extents, for the file and the location in the storage system where the extents can be found.

Figure 1:
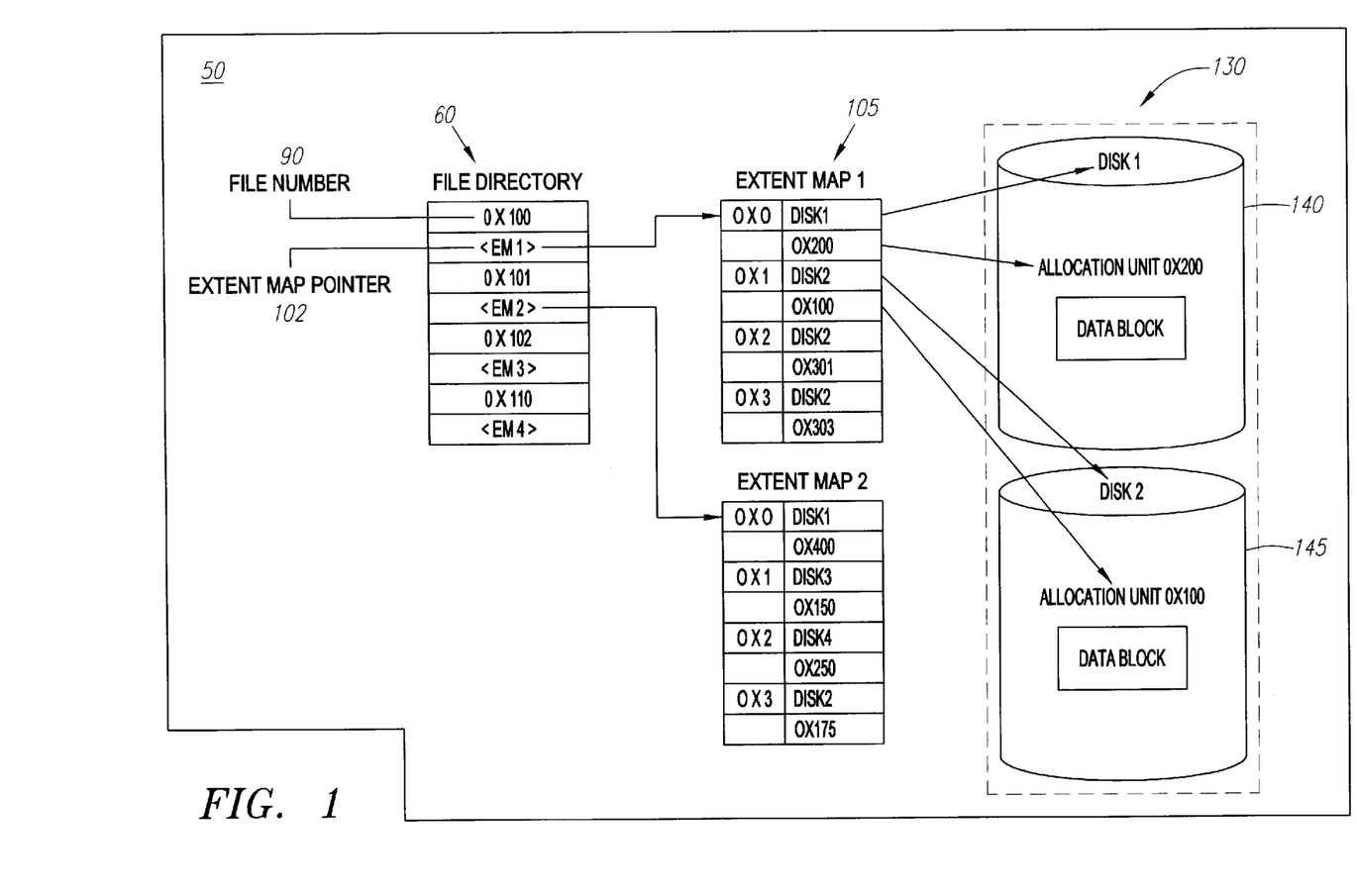
FIG. 1 is a representation of the primary metadata for an exemplary file system file.

For example, turning to FIG. 1, shown is a simple file system 50 including the primary metadata for the file system, including a file directory, extent maps, and allocation units. The file system 50 includes a file directory 60 that contains a list of files. Each file in the file directory 60 has a pointer to an extent map associated with that file. Each file is a collection of data that is represented as a discrete unit, though the members of the collection may be located in different locations in a storage system 130. A file identifier 90 is used to identify a file, which is associated with a particular set of allocated storage. The file is associated with an extent map 105 by an extent map pointer 102. The extent map 105 is a list of extents of the file, with pointers to the physical storage blocks, referred to herein as "allocation units," where the extents can be found on the storage devices. A process wishing to access an extent of the file reads the extent map 105 to find out the allocation unit containing the desired extent of the file and then accesses the data at that location. Allocation units are the blocks of space on the storage device 140, 145 containing the data that makes up the extents of the file. Allocation units associated with the file may reside on different storage devices, or they may reside on the same storage device. For simplicity, only a single allocation unit is shown for each storage device 140, 145 in FIG. 1. However, the storage devices in accordance with an embodiment of the invention contain a plurality of serially numbered allocation units.

Storage Access Keys

Figure 2:
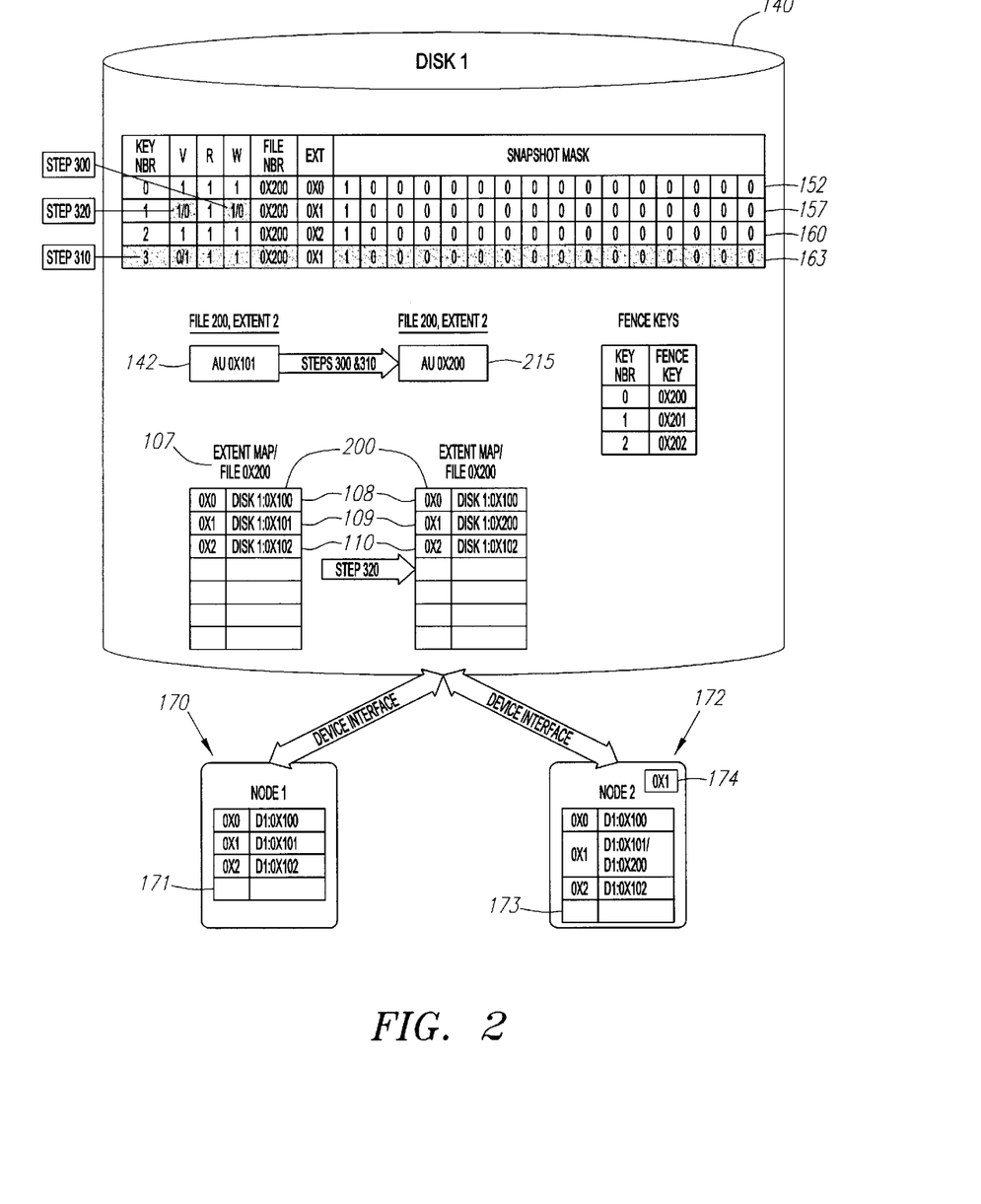
FIG. 2 is a representation of a file stored on a storage device, showing how storage access keys are used to manage access to the file, according to an embodiment of the invention.

Turning to FIG. 2, storage access keys are associated with the various units of storage in the storage device 140, e.g. extents. In an embodiment, each storage access key is associated with an allocation unit. In another embodiment, each storage access key is associated with a range of allocation units. In another embodiment, multiple storage access keys are associated with the same allocation unit. Any given allocation unit can have one or more storage access keys associated with it. The file system is responsible for initializing the storage access keys that the application will be using and determining the particular mapping between storage access keys and allocation units. The particular portion of the storage device associated with each storage access key is a design choice for those skilled in the art and is not critical to the invention.

The storage access keys in an embodiment are stored as an array. The storage access keys are enumerated by their position within the array, beginning with zero (0). Thus, Key 0 would be in the first position in the array, Key 1 in the second, and so on. In a preferred embodiment, the storage access keys are stored in the memory of a controller (not shown) for the storage system 130, of FIG. 1. In an embodiment, the storage access keys are persistent, even if the particular storage device they are associated with is deactivated. In another embodiment, the storage access keys are reconstructed from the data stored on the storage device when the storage device is re-activated. In this embodiment, the initial values of the storage keys have a default value when the storage device is activated Each storage access key includes a number of fields. Among these fields is a file number (FILE NBR) field. The file number field contains information that identifies the file associated with the data in the allocation unit linked to the storage access key. Also included is an extent (EXT) field that identifies the particular extent in the file that is associated with the data in the allocation unit linked to the storage access key. Other fields included in the storage access key include a valid flag (V), to indicate whether the data in the extent is valid; a read flag (R), that indicates whether other processes are allowed to read the data from the extent associated with the storage access key; a write flag (W), that indicates whether other processes are allowed to write data to the extent associated with the storage access key; and a snapshot mask field (SNAPSHOT MASK), that indicates whether or not there are snapshot copies of the extent stored in the extent associated with the storage access key.

In an embodiment, if only the high-order bit of the snapshot mask field is set, then the extent is private, not shared. If another bit is set, then the extent is a snapshot copy. If more than one bit of the snapshot mask is set, then the extent is shared and must be copied prior to writing. The storage access key is not limited to the fields enumerated above, and can also contain other fields.

In the example of FIG. 2, there is a one-to-one relationship between file extents and storage access keys. There is also a one-to-one relationship between allocation units and storage access keys. An extent map 200 contains the extents that make up the file bearing the file number 0X200. A first storage access key 152 is associated with a first allocation unit (not shown). A second storage access key 157 is associated with a second allocation unit 142. A third storage access key 160 is associated with a third allocation unit (not shown). The particular associations made are design choices for the application developer, and are not critical to the invention.

The first storage access key 152 has a file number field that contains the value "0X200" and an extent field containing the value "0X0", which indicates that the first allocation unit (not shown) associated with the file contains extent #1 of file 0X200, as identified by the file identifier 107 and first extent entry 108. The second storage access key 157 has a file number field that contains the value "0X200" and an extent field containing the value "0X1", which indicates that the second allocation unit 142 associated with the file contains extent #2 of file 0X200, as identified by the file identifier 107 and second extent entry 109. The third storage access key 160 has a file number field that contains the value "0X200" and an extent field containing the value "0X2", which indicates that the third allocation unit (not shown) associated with the file contains extent #3 of file 0X200, as identified by the file identifier 107 and third extent entry 110. The fourth storage access key 163 has an undefined value at this stage.

During the operation of the file system, cached copies 171, 173 of the extent map 200 for the file are created by processes on the nodes 170, 172. Various conditions can precipitate making a copy of the extent map 200 in a node's memory. For example, where the extent map 200 is stored on the storage device 140, a node creates a cached copy of the extent map 200 when a process on the node accesses the file. In another example where a first node contains the extent map 200, a second node remote from the first node accesses the file and causes a cached copy of the extent map 200 to be created in the remote node's memory. In another example, a copy of the extent map 200 is made on all nodes when the file is first created.

At some point in the operation of the storage system, the file system may move data contained in the various allocation units from one location to another within the storage system. This movement may be between locations within the same storage device, or it may be across storage devices. For the sake of simplicity, the exemplary embodiment discussed herein assumes a movement between locations within the same storage device. The data movement is done dynamically, while the data is still available to be accessed by processes running on the nodes accessing the file system. Various events can trigger the decision by the file system to move data.

If a new storage device is added to the storage system, data may be moved to fill that storage device. If an existing storage device is scheduled to be removed from the storage system, data may be moved off of the storage device to be removed. If a particular storage device is over-utilized, data may be moved off of the over-utilized storage device. If a particular storage device is under-utilized, data may be moved onto the under-utilized storage device. If changes are made to a logical copy of a file, then a new physical copy of the file or the portion of the file containing the divergent content may be made. The reasons that precipitate a data movement are design choices for those skilled in the art and are not critical to the invention.

In the exemplary embodiment of FIG. 2, the second node 172 moves the data contained in the second allocation unit 142 to a fourth allocation unit 215. This movement follows the method of FIG. 3. The second node 172 reads the contents of the second allocation unit 142 into its local memory 174 and simultaneously updates the write flag contained in the second storage access key 157 to zero (0), at step 300. This inhibits other nodes from updating the second allocation unit 142 while its contents are undergoing relocation. Updating the write flag in the storage access key is performed as part of the same operation that reads the contents of the second allocation unit 142, and does not require an additional I/O operation.

Figure 3:
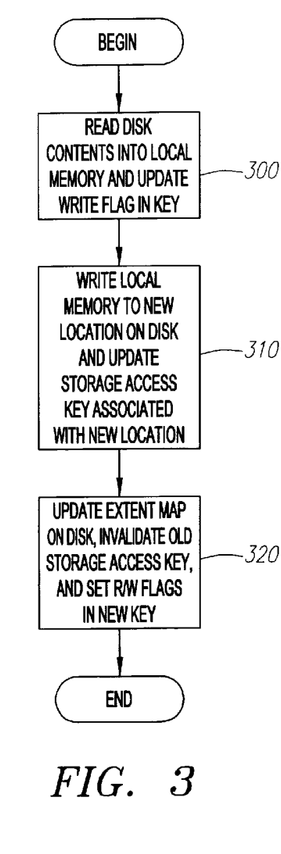
FIG. 3 is a flowchart of a method for relocating data using storage access keys, according to an embodiment of the invention.

The second node 172 then writes the data to be moved from its local memory 174 to the fourth allocation unit 215 and simultaneously updates a fourth storage access key 163 with values indicating the new contents of the fourth allocation unit 215, at step 310. Again, the storage access key update is performed as part of the I/O operation, and does not require an additional I/O operation.

Finally, the second node 172 updates the extent map 200 on the storage device 140, as well as the cached extent map copy 173 stored on the second node 172, with the new location of the data, and invalidates the second storage access key 157 by writing a zero (0) to the valid flag of the second storage access key 157, at step 320. In an embodiment, a hint as to the new location of the data is left behind in the second storage access key 157, by changing the extent field of the second storage access key 157 to a value that indicates the new location of the data at step 320. No other extent maps are modified by, nor nodes notified of, the data movement when it occurs.

Once the data contained in the second allocation unit 142 has been moved, a process running on the first node 170 may thereafter attempt to use the cached extent map copy 171 of the extent map 200 stored on the first node 170 to access the second extent entry 109. The process may attempt to access the second extent entry 109 by sending an I/O request to the storage device 140. An example of an I/O request is set forth in Table 1 below:

TABLE 1

| 1 READ(DISK1,0X101,0X1000) | | | | | | |
|---|---|---|---|---|---|---|
| 2 Field | | | | Value | | |
| Key Number | | | | 1 | | |
| Field Definition | V | R | W | File | EXT | SS MASK |
| Expected Key Value | 1 | 1 | 1 | 0X200 | 0X2 | 0 |
| Key Mask | 1 | 1 | 0 | 0XFFFFF | 0XFFFFF | 0 |
| Key-AND | 1 | 1 | 1 | 0XFFFFF | 0XFFFFF | 0XFFFF |
| Key-OR | 0 | 0 | 0 | 0 | 0 | 0 |

In this embodiment, the I/O request contains two portions, an I/O portion (1) that has information relating to the particular I/O operation to be performed, and an access key portion (2) that has information relating to the data validation operation to be performed. The I/O portion contains: 1) information identifying the I/O request type, 2) information that identifies the particular storage device within the storage system that the I/O request will access, 3) the offset into the storage device, expressed as an allocation unit number, and 4) the range of data to be operated on.

The access key portion of the I/O request contains: 1) a Key Number that identifies the storage access key the I/O request will be compared with, 2) an Expected Key Value that the I/O request will use to compare with the storage access key, 3) a Key Mask to apply to the storage access key before comparison with the key value, 4) a Key-AND field containing a value to be logically AND'ed with the storage access key after a successful match has been made, and 5) a Key-OR field containing a value to be logically OR'ed with the storage access key after a successful match has been made. The Expected Key Value contains information that identifies the file and extent that the I/O request expects to find in the allocation unit the I/O request is seeking to access. The Expected Key Value can also contain additional information, such as a flag indicating whether the I/O operation is a read or a write operation, a value indicating which process is making the I/O request, a snapshot mask, or other such information.

The Key Mask is used to disregard portions of the storage access key that are not relevant to the comparison being made. The Key Mask is logically AND'ed with the storage access key before the storage access key is compared with the Expected Key Value from the first I/O request. If the Expected Key Value matches the storage access key, the Key-AND field is used to clear portions of the storage access key, by logically AND-ing those portions with zero values. If the Expected Key Value matches the storage access key, the Key-OR field is used to set portions of the storage access key by logically OR-ing the storage access key with the Key-OR field. For example, new file and extent values could be stored into a storage access key by first logically AND-ing the portion of the storage access key that contains the file and extent values with a zero value, and then logically OR-ing the cleared portion of the storage access key with values that identify the new file and extent of the data that is stored in the allocation unit accessed by the first I/O request.

Figure 4:
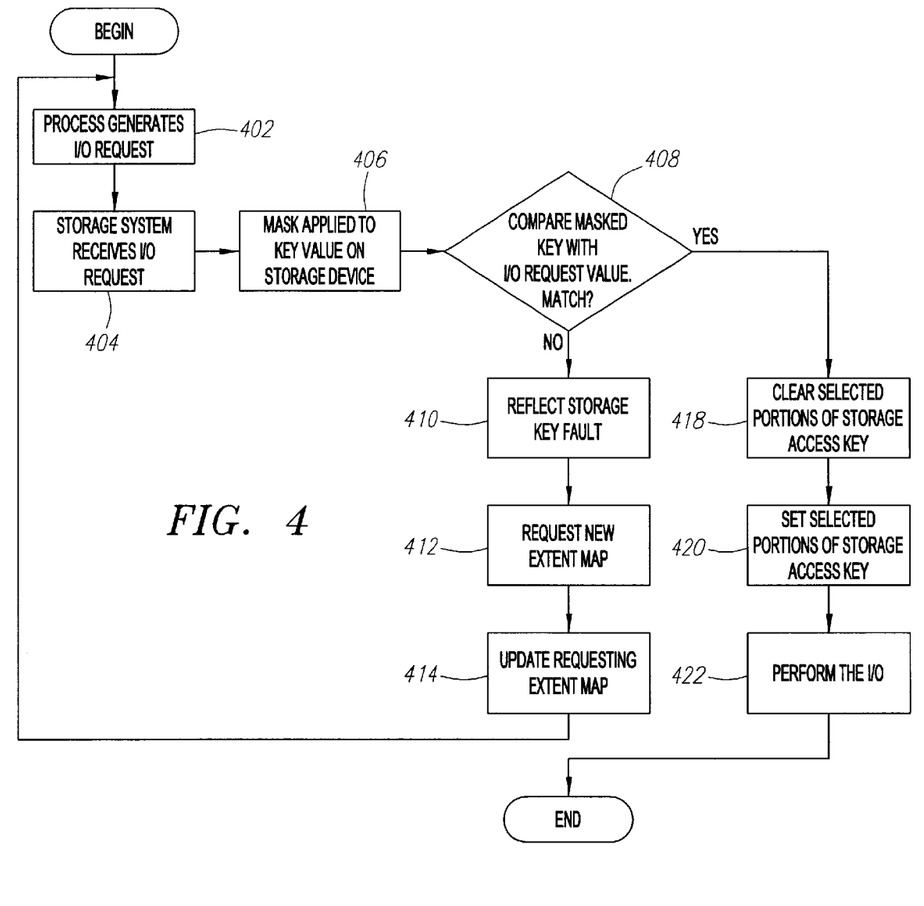
FIG. 4 is a flowchart of a method for using storage access keys in accordance with an embodiment of the invention.

FIG. 4 is a flowchart, which is illustratively explained with reference to FIG. 2. A process on the first node 170 seeks to access the data pointed to by the second extent entry 109 of the file, stored in the storage device 140. The process uses the cached extent map copy 171 of the extent map 200 to generate the I/O request shown in Table 1, at step 402. The I/O request is sent to the storage device 140, where it is determined that the I/O request is seeking access to the second allocation unit 142, at step 404. Methods of routing I/O requests are well known to those skilled in the art, and are not critical to the invention. Upon receiving the I/O request, the Expected Key Value is then compared with the second storage access key 157, to determine whether or not the second allocation unit 142 contains the data that the I/O request expects the second allocation unit 142 to contain.

The irrelevant portions of the second storage access key 157 are first discarded by being masked by AND-ing the second storage access key 157 with the value in the Key Mask field of the I/O request, at step 406. In this example, since the I/O request is a "read" request, it is not relevant whether there are snapshot copies sharing the extent, so the snapshot mask is itself masked out. The precise information to be masked out is, however, a design choice for those skilled in the art and is not critical to the invention.

The relevant portions of the second storage access key 157 are now compared with the value contained in the Expected Key Value field of the I/O request, at step 408. In a preferred embodiment, the comparison is done by doing a Boolean comparison of each of the bits of the masked second storage access key 157 with the corresponding bit in the Expected Key Value field of the I/O request. Since, after the data movement discussed above, the valid flag of the second storage access key 157 contains a value of zero (0) and the valid flag of the Expected Key Value field of the I/O request contains a value of one (1), there is no match and the comparison fails. Note that had the second storage access key 157 been re-used by another process, the valid flag of the second storage access key 157 would be set to one, and would therefore match the Expected Key Value information. However, the file number field and/or the extent field will not match the Expected Key Value information, and the comparison will still fail.

Once the comparison fails, a storage access key fault is generated, and the I/O request is denied access to the second allocation unit 142, at step 410. A message is sent back from the storage device 140 to the first node 170, notifying the process in the first node 170 making the I/O request that the cached extent map copy 171 contains obsolete information. The process then requests a new extent map, at step 412. Once the process has been notified, the next action to be taken depends on the particular implementation decisions made by the programmer of the application that initiated the I/O request.

Exemplary actions that a file system programmer could implement, at step 414, include having the first node 170 read the extent map 200 on the storage device 140 or the second cached extent map copy 173 on the second node 172, for an updated copy of the obsolete information. In an embodiment, the entire cached extent map copy 171 is refreshed. In another embodiment, only the second extent entry 109 is refreshed. In another embodiment, the notification message that is sent back from the storage device 140 to the first node 170 contains the new location for the requested data.

I/O requests can be used to change the values of the storage access keys. Turning again to FIG. 4 as illustratively explained with reference to FIG. 2, an I/O request is used to change the second storage access key 157. After the data movement operation discussed above, the second allocation unit 142 contains no valid data and is available for use, as signified by the value "0" in the valid (V) field. A process generates an I/O request that seeks to write data into the second allocation unit 142, at step 402. The exemplary I/O request of Table 2, below, includes a Key Number of "1", an Expected Key Value of all zeros, a Key Mask with a "1" in the valid flag and zeros everywhere else, a Key-AND of all zeros, and a Key-OR containing the file and extent information for the new data to be written to the second allocation unit 142.

TABLE 2

| 1 | WRITE(DISK1,0X101,0X1000) | | | | | | |
|---|---|---|---|---|---|---|---|
| 2 | Field | | | | Value | | |
| | Key Number | | | | 1 | | |
| | Field Definition | V | R | W | File | EXT | SS MASK |
| | Expected Key Value | 0 | 0 | 0 | 0 | 0 | 0 |
| | Key Mask | 1 | 0 | 0 | 0 | 0 | 0 |
| | Key-AND | 0 | 0 | 0 | 0 | 0 | 0 |
| | Key-OR | 1 | 1 | 1 | 0X300 | 0x4 | 0 |

The irrelevant portion of the second storage access key 157 is discarded by the Key Mask value of the I/O request, at step 406. In this example, everything but the valid flag is discarded. The relevant portion of the second storage access key 157 is compared with the Expected Key Value of the I/O request, at step 408. The relevant portion of the second storage access key 157 is "0", as is the Expected Key Value field of the I/O request, therefore a successful match is made. The Key-AND field of the I/O request is applied to the second storage access key 157, clearing it, at step 418. The Key-OR field of the I/O request is then applied to the second storage access key 157, at step 420. The I/O request then writes new data to the second allocation unit 142, at step 422.

The Key-OR field contains information that identifies the file and extent of the newly written data. The Key-OR field can also contain other information. In this example, since this is a write operation, the Key-OR field contains information used to indicate that the data from file 0x300 and extent 0x4 has been written to the second allocation unit 142.

In accordance with another embodiment of the invention, a copy-on-write function is enabled using storage access keys. Copy-on-write functionality is an example of one of the ways an application programmer or a file system programmer could use the storage access key concept to solve a particular programming problem. Copy-on-write functionality is used to efficiently manage separate logical files that start out as snapshot copies of a single original file. When making a copy of a file, it is inefficient and wastes storage space to physically copy the data itself into a second location in the data storage system. It is more efficient to simply create another extent map for the new logical file, and have the new extent map point to the same locations as the old extent map.

Figure 5:
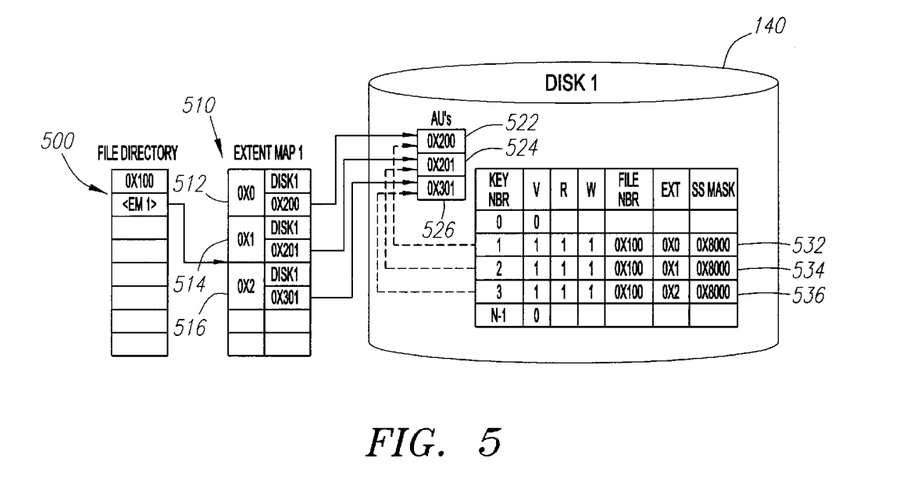
FIG. 5 is a representation of a file stored on a storage device, showing how the metadata appears prior to a snapshot copy of a file being made, in accordance with an embodiment of the invention.

In FIG. 5, a first file 500 is labeled with a file number of 0X100. The first file 500, with no snapshot copies, has three extent entries in a first extent map 510. A first extent entry 512 points to a first allocation unit 522. A second extent entry 514 points to a second allocation unit 524. A third extent entry 516 points to a third allocation unit 526. The allocation units 522, 524, 526 are contained on the storage device 140. Each allocation unit has a storage access key 532, 534, 536 associated with it. The first storage access key 532 is associated with the first allocation unit 522. The second storage access key 534 is associated with the second allocation unit 524. The third storage access key 536 is associated with the third allocation unit 526. The Valid (V), Read (R), and Write (W) flags are set to one (1) for each storage access key, to indicate that the allocation units are valid, readable, and writeable. The storage access keys each have the File Number (FILE NBR) and the Extent (EXT) set to the corresponding values derived from the extent map, indicating which extent of the file is stored in the allocation unit associated with each storage access key. The storage access keys also each have a Snapshot Mask (SS MASK), containing a one (1) in the high-order bit of the mask (0X8000), indicating that these allocation units correspond to a primary file. Unused storage access keys have their Valid flag cleared, indicating that they contain no valid data.

A process performing a write I/O operation to the second allocation unit 524 would use the I/O request of Table 3, below.

TABLE 3

| 1 WRITE(DISK1,0X201,0X1000) | | | | | | |
|---|---|---|---|---|---|---|
| 2 Field | | | | Value | | |
| Key Number | | | | 2 | | |
| Field Definition | V | R | W | File | EXT | SS MASK |
| Expected Key Value | 1 | 1 | 1 | 0X100 | 0X1 | 0 |
| Key Mask | 1 | 1 | 1 | 0XFFFFF | 0XFFFFF | 0X7FFF |
| Key-AND | 1 | 1 | 1 | 0XFFFFF | 0XFFFFF | 0XFFFF |
| Key-OR | 0 | 0 | 0 | 0 | 0 | 0 |

The Key Number in the I/O request is set to two (2), corresponding to the second storage access key 524. This key indicates that the second allocation unit contains the second extent entry 514 in the extent map 510 of the file. All Key Mask bits are set to one (1), except for the snapshot bit corresponding to the copy of the file to which the I/O operation is being directed. In this example, a write I/O operation is being directed to the primary file (non-snapshot copy), which is represented by the highest order bit (0X8000) in the Snapshot Mask. Consequently, the storage device will compare all fields in the Expected Key Value field, except for the high-order Snapshot Mask bit. In this example, the comparison is successful and the I/O request is allowed.

Figure 6:
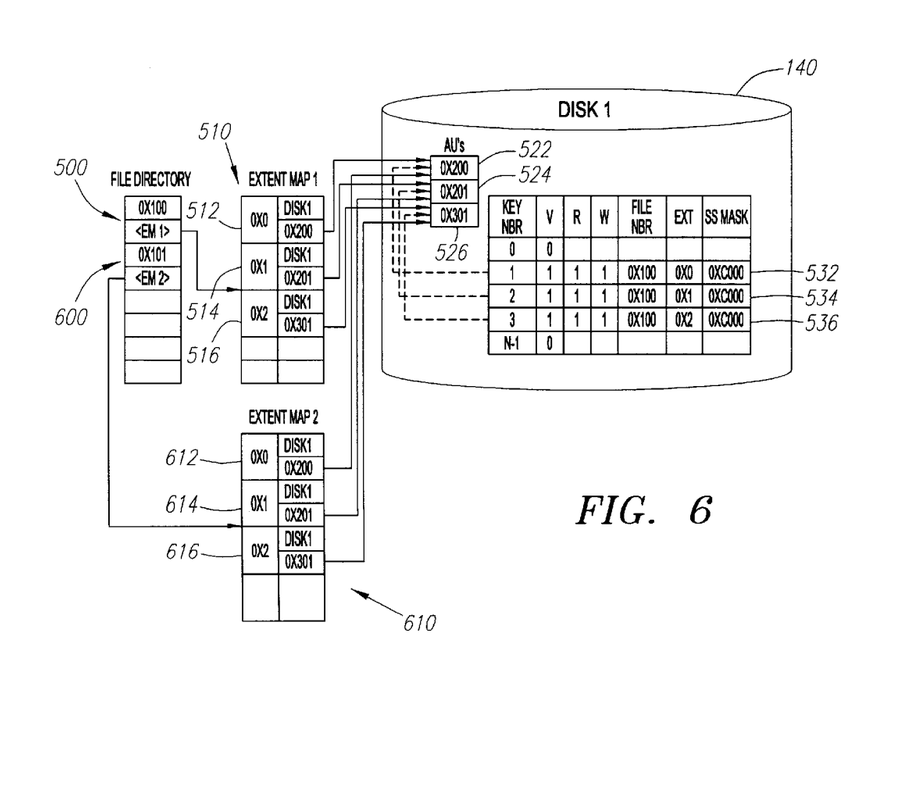
FIG. 6 is a representation of a file stored on a storage device, showing how the metadata appears after a snapshot copy of a file has been made, in accordance with an embodiment of the invention.

After a snapshot copy of the first file 500 of FIG. 5 has been made, there are two files in the file system that both point to the same locations on the storage device 140, as shown in FIG. 6. A second file 600 is created in the file directory. The second file 600 points to a second extent map 610. The second extent map 610 contains three extent entries. These extent entries point to the same allocation units as do the extent entries of the first extent map 510. A fourth extent entry 612 points to the first allocation unit 522. A fifth extent entry 614 points to the second allocation unit 524. A sixth extent entry 616 points to the third allocation unit 526. The snapshot copy 600 is assigned a new file number (0X101), but the file number field in the storage access keys remains the primary file number (0X100). When a process initiates an I/O request to the snapshot copy 600, it will use the file number of the original file 500. The bit in the Snapshot Mask fields of the storage access keys 532, 534, 536 corresponding to the snapshot copy has been set to one (1). Since in this example this is the first snapshot that has been created, the next-to-highest-order bit has been set to one (1).

Once the snapshot copy is created, a write I/O operation to either the primary file 500 or the snapshot copy 600 causes a "Copy-on-Write" storage key fault. For example, a process performing a write I/O operation to the second extent of the snapshot copy 600, stored in the second allocation unit 524, would use the I/O request of Table 4, below.

TABLE 4

| 1 WRITE(DISK1,0X201,0X1000) | | | | | | |
|---|---|---|---|---|---|---|
| 2 Field | | | | Value | | |
| Key Number | | | | 2 | | |
| Field Definition | V | R | W | File | EXT | SS MASK |
| Expected Key Value | 1 | 1 | 1 | 0X100 | 0X1 | 0 |
| Key Mask | 1 | 1 | 1 | 0XFFFFF | 0XFFFFF | 0XBFFF |
| Key-AND | 1 | 1 | 1 | 0XFFFFF | 0XFFFFF | 0XFFFF |
| Key-OR | 0 | 0 | 0 | 0 | 0 | 0 |

Since the snapshot copy 600 is a copy of the primary file 500, it uses the file name (0X100) associated with the primary file 500, rather than the snapshot copy's own file name (0X101). The Snapshot Mask in the second storage access key 534 is 0XC000, and after applying the Snapshot Mask in the I/O request of 0XBFFF, the masked value is 0X8000. This masked value does not match the snapshot mask value of zero (0), in the expected key value for the storage access key, therefore there is no match and the storage device traps the write I/O with a storage key fault.

The storage key fault inhibits the write operation and leads to the file system invoking its copy on write algorithm. In an embodiment, the copy on write algorithm creates a copy of the targeted allocation unit, using a method similar to that described above for moving data from one allocation unit to another. The details of the copy-on-write algorithm are design choices for the application or file system programmer, and are not critical to the invention. After the file system updates the file system metadata, the file system attempts the write operation again, on the newly made copy of the data, and it executes successfully.

Figure 7:
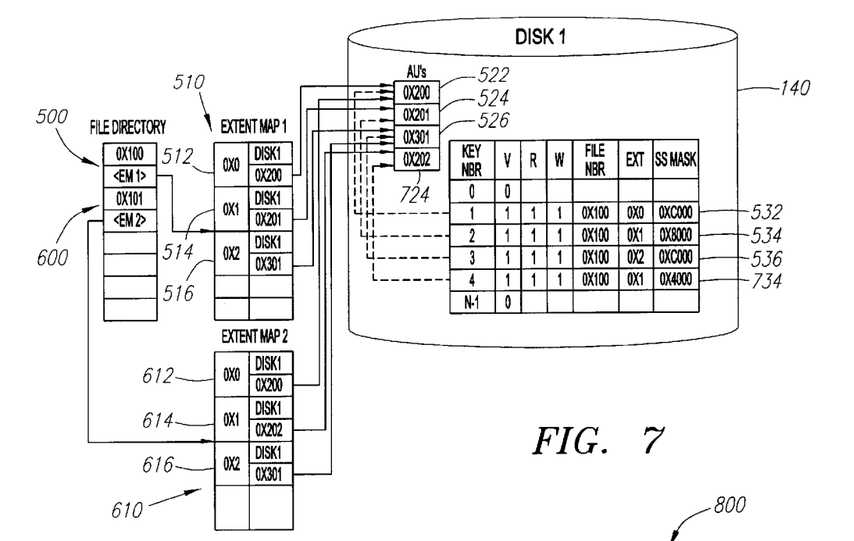
FIG. 7 is a representation of a file stored on a storage device, showing how the metadata appears after a snapshot copy of a file has been made, and after the copy-on-write fault has triggered an extent relocation, in accordance with an embodiment of the invention.

The file system metadata after the second attempt of the write operation is shown in FIG. 7. In FIG. 7, a fourth allocation unit 724 has been allocated and the data from the second allocation unit 524 has been copied into the fourth allocation unit 724. A fourth storage access key 734 has been assigned to the fourth allocation unit 724. The fourth storage access key 734 has been assigned the file number and extent number of the fifth extent entry 614. The Snapshot Mask of the fourth storage access key 734 has its next-to-highest-order snapshot mask bit set to one (1) and therefore the snapshot mask reads as 0X4000. This indicates that the fourth allocation unit 724 corresponds to the first snapshot copy 600 of the primary file 500. Since the second allocation unit 524 is no longer shared, the first snapshot mask bit of the second storage access key 534 is cleared. The snapshot mask field of the second storage access key 534 now reads 0X8000.

Fence Keys

Figure 8:
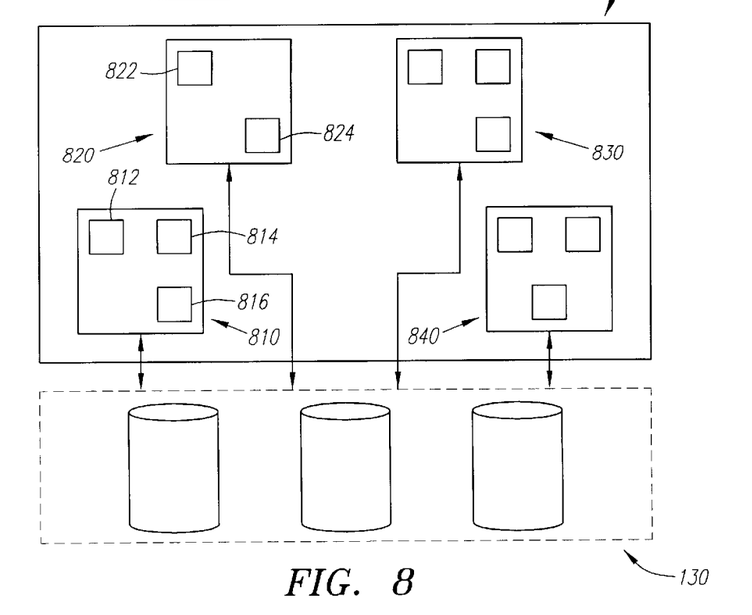
FIG. 8 is a high-level representation of a file system and an associated storage system, in accordance with an embodiment of the invention.

Fence keys are a mechanism in which metadata updates within a process family can continue in a secure fashion, even in the face of a split-brain condition, as discussed above. Turning now to FIG. 8, in an embodiment, a file system 800 includes nodes 810, 820, 830, 840. In an embodiment, each node 810, 820, 830, 840 is a separate CPU and associated circuitry, which is associated with the storage system 130. In another embodiment, the nodes 810, 820, 830, 840 each contain multiple CPUs. A first node 810 contains processes 812, 814, 816 that are running on the first node 810. A second node 820 contains processes 822, 824 that are running on the second node 820. Each process 812, 814, 816, 822, 824, during its normal operations, transmits I/O requests to the storage system 130, as shown by the arrows.

In an embodiment, each I/O request sent to the storage system contains information identifying the process that is making the I/O request. In another embodiment, the I/O request contains information identifying the application that is making the I/O request, where an application includes multiple processes. Within the node of the file system, the precise nature of the entity making the I/O requesting entity is a design choice for those skilled in the art and is not critical to the invention.

When the I/O request is sent to the storage system, the process making the request is checked against a collection of processes that are allowed to access the data on the storage system. If the requesting process is in the collection of allowed processes, the requesting process is allowed access to the data. If the requesting process is not in the collection of processes allowed to access the data, the requesting process is denied access to the data.

Figures 9, 10:
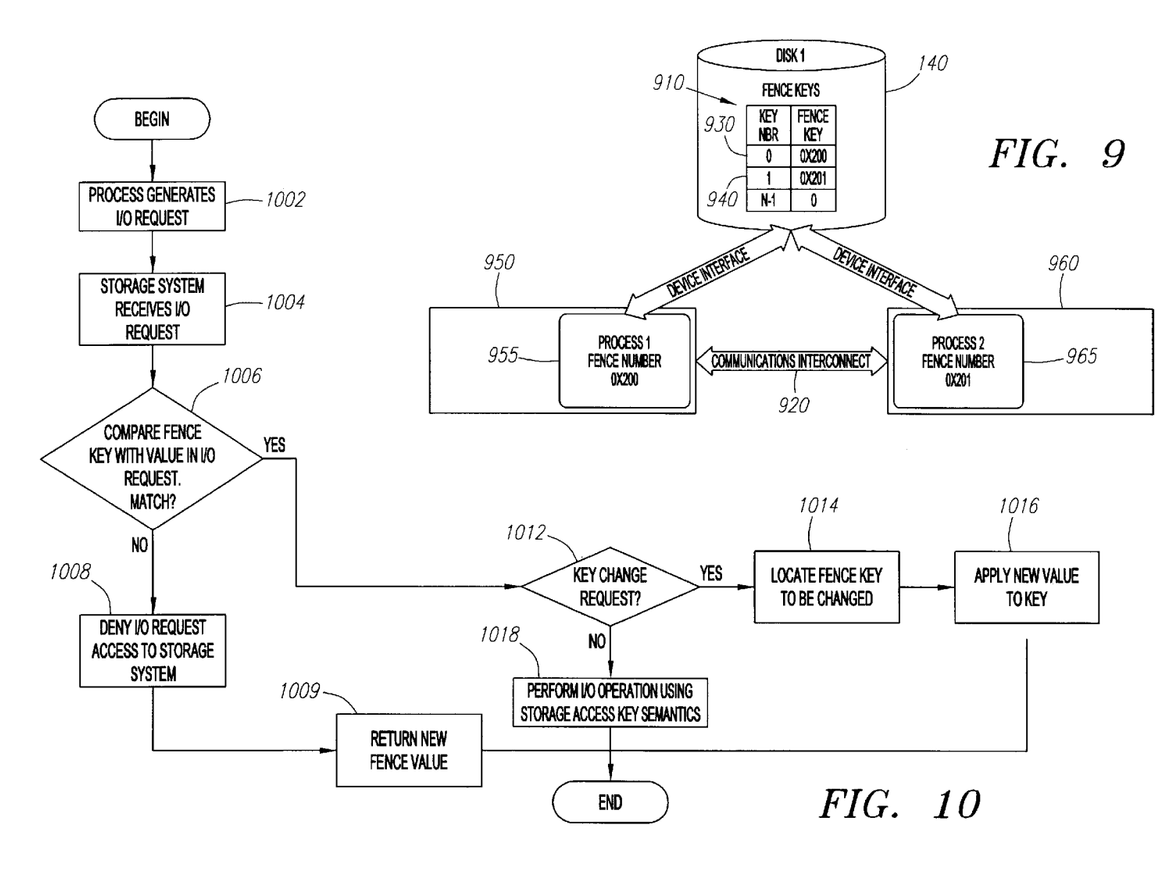
FIG. 9 is a representation of two processes using fence keys in accordance with an embodiment of the invention.
FIG. 10 is a flowchart of a method for using fence keys in accordance with an embodiment of the invention.

Turning to FIG. 9, in an embodiment, inside the storage device 140 is a collection of fence keys 910. The fence keys are numbered from 0 to N−1, N being the number of fence keys in the collection. Each fence key corresponds to a process on a node. The contents of the fence values are negotiated at start-up time through messages exchanged through the communications interconnect 920 used by the family of processes sharing the storage device 140. Access to the storage device by a process is authorized by comparing the fence key entry associated with the process with the value specified in the I/O request that is seeking access.

In an embodiment the fence keys are stored on the storage device 140. In another embodiment the fence keys are stored in the memory of a controller (not shown) for the storage system containing the storage device 140. In an embodiment, the fence keys are persistent, even if the particular storage device they are associated with is deactivated. In another embodiment, the fence keys are reconstructed from the data stored on the storage device 140 when the storage In the exemplary embodiment of FIG. 9, the storage device 140 is being shared by a first process 955 running on a first node 950, and a second process 965 running on a second node 960. The nodes 950, 960 also contain other processes, which are omitted for the sake of clarity. A first fence key 930 is initialized on the storage device 140 and associated with the first process 955 running on the first node 950. A second fence key 940 is initialized on the storage device 140 and associated with the second process 965 running on the second node 960.

In an embodiment, each process has a fence key associated with it. Alternatively, a collection of processes can be associated with a fence key. The fence keys are assigned when the processes 955, 965 are initialized. Alternatively, the fence keys can be assigned when the processes 955, 965 first attempt to access the storage device 140. The first process 955 and the second process 965 are located on different nodes. Alternatively, the first process 955 can be located on the same node as the second process 965. Each storage device preferably contains a separate fence key for each process.

When the first process 955 is initialized, the first fence key 930 is assigned a fence value. When the second process 965 is initialized, the second fence key 940 is assigned a fence value. The fence values are preferably unique, non-recurring values that serve to identify the specific process. For example, the fence key values can be based upon the interval of time that has passed from a pre-defined reference time up to the time the process associated with the fence key is created.

If communications between a process on an operating node and a process on another node is lost, and a process on the operating node needs to update file system metadata, then the operating process will change the fence key value of the fence key associated with the process to which communications has been lost. This locks out the other process from further access to the storage device. After the other process recovers and has reestablished communications, it interrogates the operating node as to the new fence key value and begins normal operation again.

As a practical example of the operation of the fence keys of an embodiment, assume the first process 955 seeks to access the storage device 140. Turning to the flowchart of FIG. 10, with reference to FIG. 9, the first process 955 generates an I/O request, requesting access to the storage device 140, at step 1002. In an embodiment, the I/O request is as shown in Table 5 below:

TABLE 5

| 1 | READ(DISK1,0X101,0X1000) | |
|---|---|---|
| 2 | Fence Key Number | 0 |
|   | Expected Fence Value | 0X200 |

In another embodiment, the I/O request contains both storage access key information and fence key information, as shown in Table 6:

TABLE 6

| 1 READ(DISK1,0X101,0X1000) | | | | | | |
|---|---|---|---|---|---|---|
| 2 Field | | | | Value | | |
| Key Number | | | | 2 | | |
| Field Definition | V | R | W | File | EXT | SS MASK |
| Expected Key Value | 1 | 1 | 1 | 0X200 | 0X101 | 0 |
| Key Mask | 1 | 1 | 1 | 0XFFFFFF | 0XFFFFF | 0 |
| Key-AND | 1 | 1 | 1 | 0XFFFFFF | 0XFFFFF | 0XFFFF |
| Key-OR | 0 | 0 | 0 | 0 | 0 | 0 |
| 3 Fence Key Number | 0 | | | | | |
| Expected Fence Value | 0X200 | | | | | |

The I/O request of Table 6 contains three portions: an I/O portion (1), as described above, optionally a storage access key portion (2) as described above, and a fence key portion (3). The fence key portion contains a Fence Key Number, which identifies the fence key that the I/O request will be compared with, and an Expected Fence Value that the I/O request will use to compare with the fence key.

At step 1004, the I/O request is sent to the first storage device 140. The storage device 140, locates the Fence Key Number (0) within the I/O request, and determines that the first fence key 930 is the proper fence key to compare with the I/O request. The storage device 140 compares the fence value (0X200) contained in the first fence key 930 with the Expected Fence Value (0X200) contained in the I/O request, at step 1006. In an embodiment, the comparison is done by a Boolean compare of each of the bits of the Expected Fence Value with the corresponding bits of the fence value contained in the first fence key 930. Precise methods of comparing two values are design choices for those skilled in the art, and are not critical to the invention.

Since in this example embodiment, the Expected Fence Value and the fence value contained in the first fence key 930 are the same, the comparison succeeds. At step 1012 there is no key change request. Where the I/O request contains both a fence key portion and a storage access key portion, the storage device 140 then processes the storage access key portion of the I/O request, using the methods discussed above, at step 1018. Alternatively, the storage device 140 processes the storage access key portion of the I/O request first, then processes the fence key portion, and if both keys match, the I/O request is completed. The ordering of the processing of the portions is a design choice for those skilled in the art and is not critical to the invention.

From time to time, it is desired that the second process 965 be denied access to the storage device 140. There are various reasons why the second process 965 needs to be denied access to the storage device 140. The second process 965 may be malfunctioning, or the second process 965 may appear to an observer, such as the first process 955 or the storage device 140, to be malfunctioning because, for example, the second process 965 has stopped communicating with the observer. The various reasons for denying the second process 965 access to the storage device 140 are design choices for those skilled in the art and are not critical to the invention.

Figure 11:
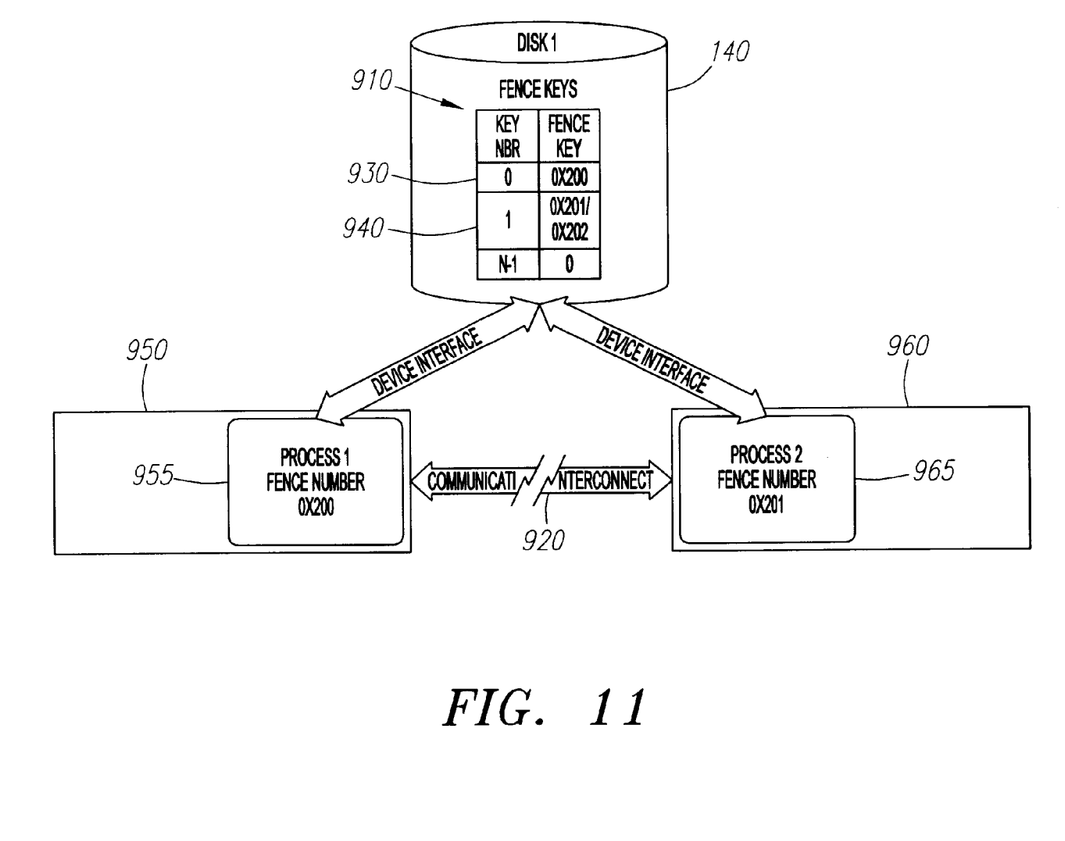
FIG. 11 is a representation of the use of fence keys to block a process from accessing the storage device, in accordance with an embodiment of the invention.

A practical example of how fence keys block a process from accessing the storage device 140 is shown using the flowchart of FIG. 10 with reference to the system of FIG. 11. In FIG. 11, the communications interconnect 920 has been broken. The first process 955 detects this, and at step 1002 the first process 955 sends an access-blocking request to the storage device 140, asking the storage device 140 to block the second process 965 from accessing the storage device 140. Methods of detecting communications failures in a file system are well known to those skilled in the art, and are not critical to the invention. In an embodiment, the first process 955 seeks to block the second process 965 from accessing all of the storage devices in a storage system. In another embodiment, the first process 955 seeks to block the second process 965 from accessing some or only one of the storage devices in the storage system.

An example of an access-blocking request is shown in Table 7 below:

TABLE 7

| 1 | SET_FENCE_KEY(DISK1,1,0X202) | | | | | |
|---|---|---|---|---|---|---|
| 2 | Field | | | | Value | |
| | Key Number | | | | 2 | |
| | Field Definition | V | R | W File | EXT | SS MASK |
| | Expected Key Value | 0 | 0 | 0 0 | 0 | 0 |
| | Key Mask | 0 | 0 | 0 0 | 0 | 0 |
| | Key-AND | 1 | 1 | 1 0XFFFFF | 0XFFFFF | 0XFFFF |
| | Key-OR | 0 | 0 | 0 0 | 0 | 0 |
| 3 | Fence Key Number | 0 | | | | |
| | Expected Fence Value | 0X200 | | | | |

The access-blocking request contains three sections. The first section (1) identifies the type of request being made, and contains information to identify the storage device being accessed, a target fence key number of one (1), which is the number of the fence key the access blocking request seeks to change, and a new fence key value of 0X202, which is the value that the blocking request seeks to change the targeted fence key to. The second section (2) is optional and contains storage access key information. In this example, storage access keys are not involved, so the Key Mask is set to all zeros, ensuring against a storage access key fault. The third section (3) contains the Fence Key Number and Expected Fence Value of the process making the access-blocking request, as discussed above. This information is included because a process wishing to change the access rights of another process must first itself be granted access to the storage system.

In the exemplary embodiment, the access-blocking request is sent to the storage device 140 by the first process 955, at step 1004. The storage device 140 uses the method described above to verify that the first process 955 is itself allowed to access the storage device 140, at step 1006. In this exemplary embodiment, the first process 955 passes the access test, and the access-blocking request is accepted. In another embodiment, the first process 955 fails the access test because the first process 955 has itself been blocked by another entity, such as the second process 965 or the storage device 140, and the access blocking request is rejected, at step 1008.

Once the access-blocking request has passed the access test and been accepted by the storage device 140, at step 1012 it is noted that this request seeks to change a fence key. The target fence key number is read from the access-blocking request at step 1014. In this example, the target fence key number is one (1), which references the second fence key 940, associated with the second process 965. The New Fence Value of 0X202 is then read from the access-blocking request, and the New Fence Value is written to the second fence key 940, at step 1016. The New Fence Value is a pre-defined blocking value. In an embodiment, the access-blocking request is then applied in a similar manner to all of the storage devices in the storage system. In another embodiment, the access-blocking request contains additional information indicating which storage devices in the storage system the access-blocking request will be applied to.

The above set fence key operation is an example of one operation that can be implemented using the fence keys and storage access keys of an embodiment of the invention. Other operations can also be implemented using fence keys and storage access keys in accordance with an embodiment of the invention. Exemplary operations include, an operation that retrieves a fence key, an operation that sets a storage access key, and/or an operation that retrieves a storage access key.

In another embodiment, once the access-blocking request has changed the fence key value stored in the second fence key 940, the second process 965 may attempt to access the storage device 140. The second process 965 generates an I/O request as described above, using the Fence Key Number of "1" and the Expected Fence Value of "0x201". The second fence key 940 is compared with the I/O request. The Expected Fence Value is compared with the newly changed fence key value of the second fence key 940, at step 1006. Since in this example, the expected fence value is 0X201, and the fence value of the second fence key 940 is 0X202, the two values are different, the comparison fails, a fence key fault is triggered and the second process is denied access to the storage device 140, at step 1008. At step 1009, the new fence value is returned to the process making the I/O request.

The fence key fault indicates that the second process 965 should initiate recovery proceedings. In an embodiment, these recovery proceedings would include the second process 1) invalidating all cached copies of its extent maps, 2) re-negotiating its key value with the other nodes in the file system, 3) and restoring communications with the first node 950. The pre-defined blocking value stored in the second fence key 940 could also be used as a pointer indicating which node it was that did the fencing. The details of these proceedings are design choices for the applications programmer or the file system programmer, and are not critical to the invention.

SYSTEM ARCHITECTURE OVERVIEW

Figure 12:
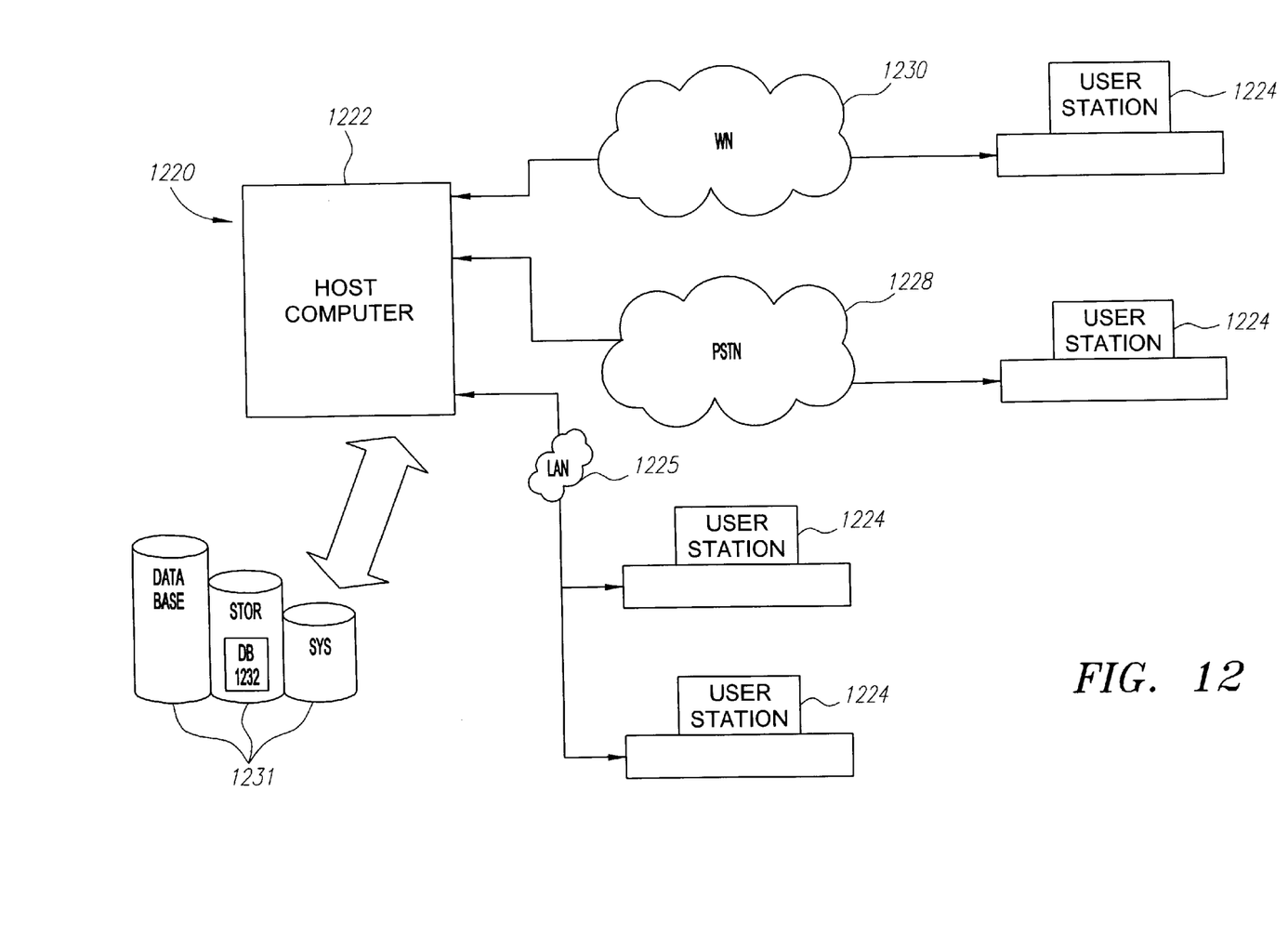
FIG. 12 is a representation of a computer system in accordance with an embodiment of the invention.

Referring to FIG. 12, in an embodiment, a computer system 1220 includes a host computer 1222 connected to a plurality of individual user stations 1224. In an embodiment, the user stations 1224 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 1224 are connected to the host computer 1222 via a local area network ("LAN") 1225. Other user stations 1224 are remotely connected to the host computer 1222 via a public telephone switched network ("PSTN") 1228 and/or a wireless network 1230.

In an embodiment, the host computer 1222 operates in conjunction with a data storage system 1231, wherein the data storage system 1231 contains a database 1232 that is readily accessible by the host computer 1222.

In alternative embodiments, the database 1232 may be resident on the host computer, stored, e.g., in the host computer's ROM, PROM, EPROM, or any other memory chip, and/or its hard disk. In yet alternative embodiments, the database 1232 may be read by the host computer 1222 from one or more floppy disks, flexible disks, magnetic tapes, any other magnetic medium, CD-ROMs, any other optical medium, punchcards, papertape, or any other physical medium with patterns of holes, or any other medium from which a computer can read.

In an alternative embodiment, the host computer 1222 can access two or more databases 1232, stored in a variety of mediums, as previously discussed.

Figure 13:
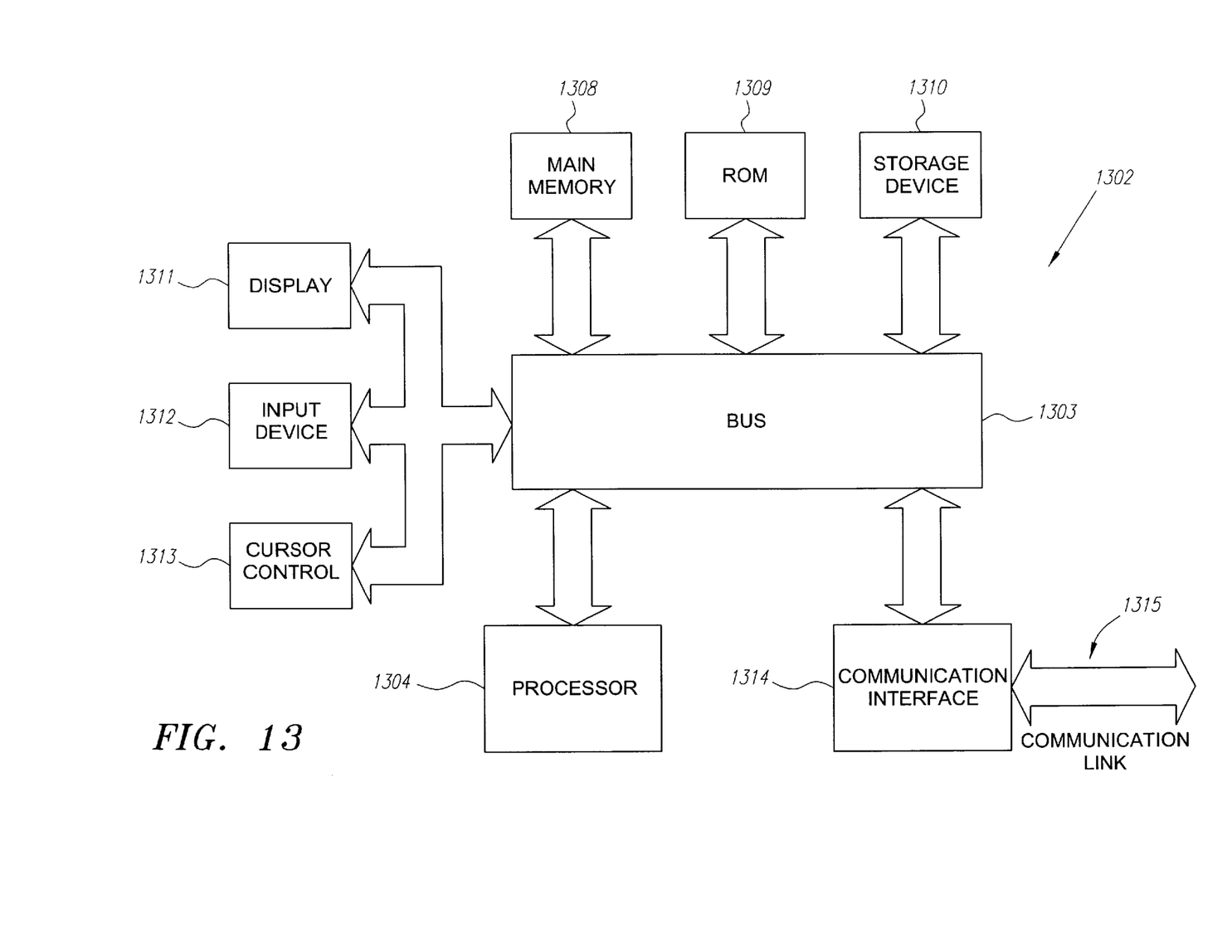
FIG. 13 is a representation of a processing unit in accordance with an embodiment of the invention.

Referring to FIG. 13, in an embodiment, each user station 1224 and the host computer 1222, each referred to generally as a processing unit, embodies a general architecture 1302. A processing unit includes a bus 1303 or other communication mechanism for communicating instructions, messages and data, collectively, information, and one or more processors 1304 coupled with the bus 1303 for processing information. A processing unit also includes a main memory 1308, such as a random access memory (RAM) or other dynamic storage device, coupled to the bus 1303 for storing dynamic data and instructions to be executed by the processor(s) 1304. The main memory 1308 also may be used for storing temporary data, i.e., variables, or other intermediate information during execution of instructions by the processor(s) 1304.

A processing unit may further include a read only memory (ROM) 1309 or other static storage device coupled to the bus 1303 for storing static data and instructions for the processor(s) 1304. A storage device 1310, such as a magnetic disk or optical disk, may also be provided and coupled to the bus 1303 for storing data and instructions for the processor(s) 1304.

A processing unit may be coupled via the bus 1303 to a display device 1311, such as, but not limited to, a cathode ray tube (CRT), for displaying information to a user. An input device 1312, including alphanumeric and other keys, is coupled to the bus 1303 for communicating information and command selections to the processor(s) 1304. Another type of user input device may include a cursor control 1313, such as, but not limited to, a mouse, a trackball, a fingerpad, or cursor direction keys, for communicating direction information and command selections to the processor(s) 1304 and for controlling cursor movement on the display 1311.

According to one embodiment of the invention, the individual processing units perform specific operations by their respective processor(s) 1304 executing one or more sequences of one or more instructions contained in the main memory 1308. Such instructions may be read into the main memory 1308 from another computer-usable medium, such as the ROM 1309 or the storage device 1310. Execution of the sequences of instructions contained in the main memory 1308 causes the processor(s) 1304 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1304. Such a medium may take many forms, including, but not limited to, non-volatile, volatile and transmission media. Non-volatile media, i.e., media that can retain information in the absence of power, includes the ROM 1309. Volatile media, i.e., media that can not retain information in the absence of power, includes the main memory 1308. Transmission media includes coaxial cables, copper wire and fiber optics, including the wires that comprise the bus 1303. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 1304 can retrieve information.

Various forms of computer-usable media may be involved in providing one or more sequences of one or more instructions to the processor(s) 1304 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 1303 may receive the infrared signals and place the instructions therein on the bus 1303. The bus 1303 may carry the instructions to the main memory 1308, from which the processor(s) 1304 thereafter retrieves and executes the instructions. The instructions received by the main memory 1308 may optionally be stored on the storage device 1310, either before or after their execution by the processor(s) 1304.

Each processing unit may also include a communication interface 1314 coupled to the bus 1303. The communication interface 1314 provides two-way communication between the respective user stations 1224 and the host computer 1222. The communication interface 1314 of a respective processing unit transmits and receives electrical, electromagnetic or optical signals that include data streams representing various types of information, including instructions, messages and data.

A communication link 1315 links a respective user station 1224 and a host computer 1222. The communication link 1315 may be a LAN 1225, in which case the communication interface 1314 may be a LAN card. Alternatively, the communication link 1315 may be a PSTN 1228, in which case the communication interface 1314 may be an integrated services digital network (ISDN) card or a modem. Also, as a further alternative, the communication link 1315 may be a wireless network 1230.

A processing unit may transmit and receive messages, data, and instructions, including program, i.e., application, code, through its respective communication link 1315 and communication interface 1314. Received program code may be executed by the respective processor(s) 1304 as it is received, and/or stored in the storage device 1310, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense, and the invention is not to be restricted or limited except in accordance with the following claims and their legal equivalents.

What is claimed is:

1. A method for managing access to a first data location on a storage device, the method comprising:
    receiving from a requestor a request to access a first data location on a storage device, the request comprising a first set of information adapted to identify the first data location and a second set of information adapted to identify data expected to be in the first data location, the second set of information adapted to be compared with a third set of information, the third set of information being adapted to identify data stored in the first data location, the third set of information being associated with the storage device;
    comparing the second set of information with the third set of information;
    granting access to the first data location if the second set of information matches the third set of information;
    denying access to the first data location if the second set of information does not match the third set of information; and
    notifying the requestor that the second set of information does not match the third set of information if the second set of information does not match the third set of information.

2. The method of claim 1, further comprising notifying the requestor of a second data location, the second data location containing the data expected to be in the first data location.

3. The method of claim 1, further comprising disregarding a portion of the third set of information by applying a mask to the third set of information.

4. The method of claim 1, further comprising changing a portion of the third set of information by applying a mask to the third set of information.

5. The method of claim 4, wherein the comparing and changing actions are executed as an atomic operation.

6. The method of claim 1, wherein the third set of information is persistent.

7. The method of claim 1, wherein the storage device is a first storage device and the third set of information is stored in a second storage device.

8. The method of claim 7, wherein the second storage device is a memory.

9. The method of claim 1, wherein the request to access the first data location is a data input request.

10. The method of claim 1, wherein the request to access the first data location is a data output request.

11. The method of claim 1, wherein the request to access the first data location is a data movement request.

12. A computer program product that includes a medium useable by a processor, the medium comprising instructions which, when executed by said processor, causes said processor to execute a process for managing access to a first data location on a storage device, the process comprising:
    receiving from a requestor a request to access a first data location on a storage device, the request comprising a first set of information adapted to identify the first data location and a second set of information adapted to identify data expected to be in the first data location, the second set of information adapted to be compared with a third set of information, the third set of information being adapted to identify data stored in the first data location, the third set of information being associated with the storage device;
    comparing the second set of information with the third set of information;
    granting access to the first data location if the second set of information matches the third set of information;
    denying access to the first data location if the second set of information does not match the third set of information; and
    notifying the requestor that the second set of information does not match the third set of information if the second set of information does not match the third set of information.

13. The computer program product of claim 12, further comprising notifying the requestor of a second data location, the second data location containing the data expected to be in the first data location.

14. The computer program product of claim 12, further comprising disregarding a portion of the third set of information by applying a mask to the third set of information.

15. The computer program product of claim 12, further comprising changing a portion of the third set of information by applying a mask to the third set of information.

16. The computer program product of claim 15, wherein the comparing and changing actions are executed as an atomic operation.

17. The computer program product of claim 12, wherein the third set of information is persistent.

18. The computer program product of claim 12, wherein the storage device is a first storage device and the third set of information is stored in a second storage device.

19. The computer program product of claim 18, wherein the second storage device is a memory.

20. The computer program product of claim 12, wherein the request to access the first data location is a data input request.

21. The computer program product of claim 12, wherein the request to access the first data location is a data output request.

22. The computer program product of claim 12, wherein the request to access the first data location is a data movement request.

23. A system for managing access to a first data location on a storage device, the system comprising:

an access request receiver adapted to receive an access request from a requestor, the access request comprising a first set of information adapted to identify a first data location on a storage device and a second set of information adapted to identify data expected to be in the first data location, the second set of information adapted to be compared with a third set of information, the third set of information being adapted to identify data stored in the first data location, the third set of information being associated with the storage device;

a key fetcher adapted to locate and retrieve the third set of information;

a key comparer adapted to compare the second set of information with the third set of information, generate a comparison success if the second set of information matches the third set of information, and generate a comparison failure if the second set of information does not match the third set of information;

a comparison success processor adapted to respond to the comparison success by taking a success action; and a comparison failure processor adapted to respond to the comparison failure by taking a failure action.

24. The system of claim 23, wherein the success action comprises granting access to the first data location.

25. The system of claim 23, wherein the failure action comprises denying access to the first data location.

26. The system of claim 23, wherein the failure action comprises notifying the requestor that the second set of information does not match the third set of information.

27. The system of claim 23, further comprising a mask applier.

28. The system of claim 27, wherein the mask applier is adapted to discard a portion of the third set of information.

29. The system of claim 27, wherein the mask applier is adapted to modify a portion of the third set of information.

30. The system of claim 23, wherein the third set of information is persistent.

31. The system of claim 23, wherein the storage device is a first storage device and the third set of information is stored in a second storage device.

32. The system of claim 31, wherein the second storage device is a memory.

33. The system of claim 23, wherein the request to access the first data location is a data input request.

34. The system of wherein the request to access the first data location is a data output request.

35. The system of claim 23, wherein the request to access the first data location is a data movement request.

* * * * *